United States Patent
Struble

(10) Patent No.: US 6,745,253 B2
(45) Date of Patent: Jun. 1, 2004

(54) SYSTEM AND METHOD FOR LOCATING AND USING A PERIPHERAL DEVICE

(75) Inventor: Christian L. Struble, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 448 days.

(21) Appl. No.: 09/816,606

(22) Filed: Mar. 24, 2001

(65) Prior Publication Data

US 2002/0138671 A1 Sep. 26, 2002

(51) Int. Cl.⁷ .............................. G06F 3/00; G06F 3/12
(52) U.S. Cl. .............................. 710/10; 710/64; 710/72; 340/825; 340/29
(58) Field of Search ................................ 710/15, 17, 5, 710/10, 36, 46, 64, 72; 340/384.1, 825.22, 825.29

(56) References Cited

U.S. PATENT DOCUMENTS

| | | | | | |
|---|---|---|---|---|---|
| 5,550,861 | A | * | 8/1996 | Chan et al. | 375/222 |
| 5,602,854 | A | * | 2/1997 | Luse et al. | 370/313 |
| 5,939,981 | A | * | 8/1999 | Renney | 340/539.32 |
| 6,012,103 | A | * | 1/2000 | Sartore et al. | 710/8 |
| 6,308,227 | B1 | * | 10/2001 | Kumar et al. | 710/4 |

* cited by examiner

*Primary Examiner*—Kim Huynh

(57) ABSTRACT

The present disclosure relates to a system and method for locating and using a peripheral device. The system is arranged such that a user can wirelessly transmit an initial communication with a computing device, await an audible signal from a peripheral device identifying its location, and wirelessly transmit data to the peripheral device with the computing device. By way of example, the computing device can comprise a portable computing device such as a personal digital assistant (PDA).

24 Claims, 7 Drawing Sheets

SYSTEM AND METHOD FOR LOCATING AND USING A PERIPHERAL DEVICE

FIELD OF THE INVENTION

The present disclosure relates to a system and method for locating and using a peripheral device. More particularly, the disclosure relates to a system and method for locating a peripheral device, determining its functionality, and wirelessly communicating with the device to make use of the device.

BACKGROUND OF THE INVENTION

From time to time, persons in unfamiliar office environments wish to use peripheral devices within the environment. For instance, a person may wish to print data that is stored in a portable computing device such as a notebook computer or personal digital assistants (PDAs). To cite a specific example, a salesperson that is making a presentation to a potential customer at the customer's premises may wish to print out various documents and distribute them to various employees of the customer. In such a situation, it may be difficult for the salesperson to locate a printer that both is capable of receiving data transmitted from the portable computing device and that supports the particular functionality that the sender may desire (e.g., paper size, color printing, collating, stapling, etc.).

Although known locator protocols such as global positioning systems (GPS) can be utilized to locate peripheral devices, implementation of such protocols requires the portable computing device and peripheral devices to be equipped with locator devices and may further require payment for the provision of a location service (e.g., for satellite usage). Clearly, the costs involved in such an arrangement is are prohibitively high. In addition, even though the person can potentially locate one or more peripheral devices in this manner, this method does not provide the user with information as to whether the peripheral devices support the particular functionality the person is seeking.

From the above, it can be appreciated that it would be desirable to have a relatively simple system and method with which a person can locate one or more peripheral devices and determine the functional capabilities of the devices so that the person can determine whether he or she wishes to use the devices.

SUMMARY OF THE INVENTION

The present disclosure relates to a system and method for locating and using a peripheral device. The method comprises the steps of wirelessly transmitting an initial communication with a computing device, awaiting an audible signal from a peripheral device identifying its location, and wirelessly transmitting data to the peripheral device with the computing device.

In one embodiment, the system comprises means for wirelessly transmitting an initial communication from a computing device to the peripheral device, means for emitting an audible signal from the peripheral device upon receipt of the initial wireless communication from the computing device, and means for wirelessly transmitting data from the computing device to the peripheral device. In another embodiment, the system comprises logic configured to wirelessly transmit an initial communication from a computing device to the peripheral device, logic configured to emit an audible signal from the peripheral device upon receipt of the initial wireless communication from the computing device, and logic configured to wirelessly transmit data from the computing device to the peripheral device.

Other features, systems, methods, and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
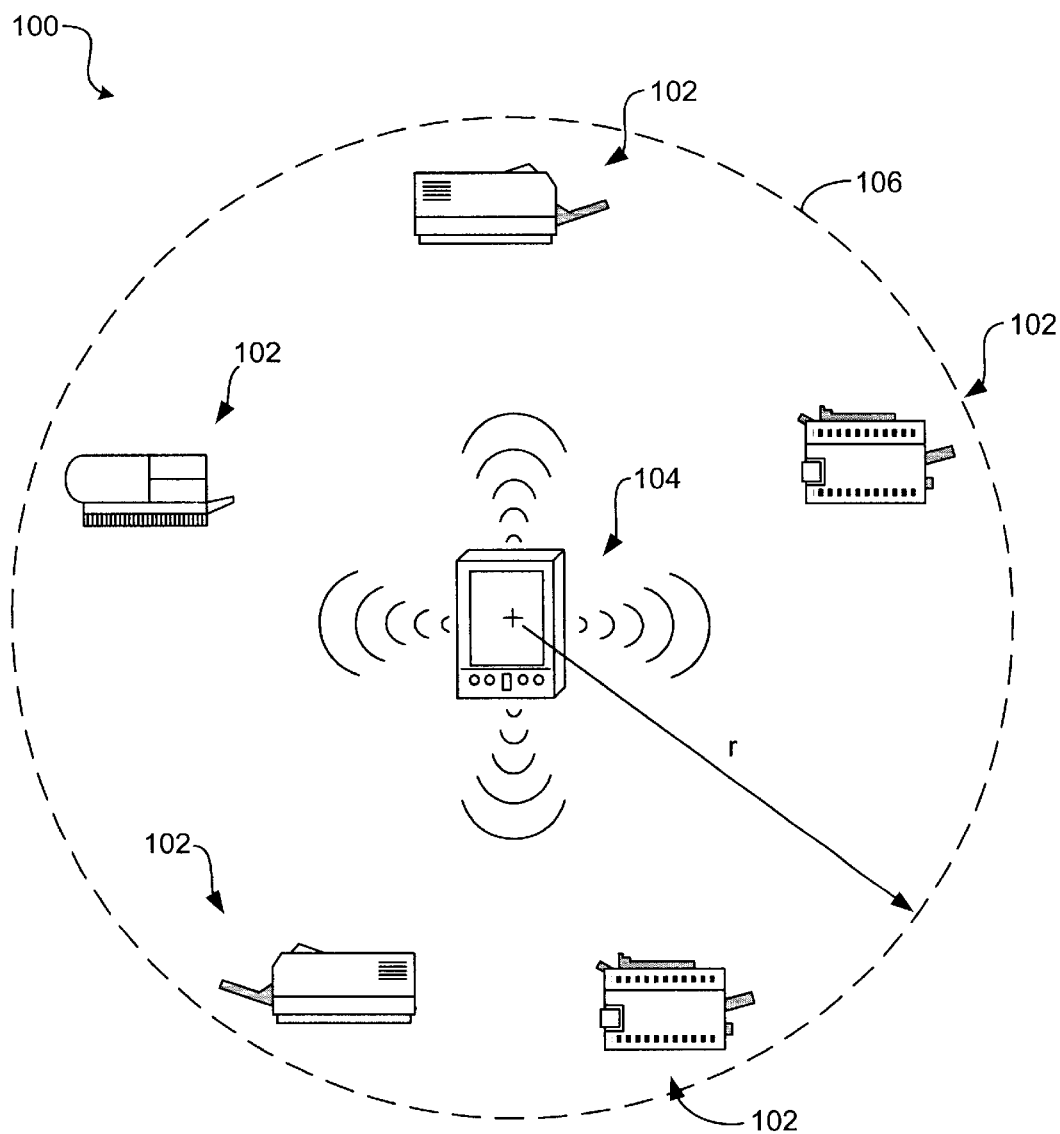
FIG. 1 is a schematic view of a system for locating and using a peripheral device.

Referring now in more detail to the drawings, in which like numerals indicate corresponding parts throughout the several views, FIG. 1 illustrates a system 100 for locating and using a peripheral device. The system 100 can comprise one or more peripheral devices 102 that, by way of example, comprise printers. Although described in this example as comprising printers, it is to be understood that the peripheral devices 102 can comprise alternative peripheral devices that can receive transmitted data and perform a given peripheral functionality. Also shown in FIG. 1 is a portable computing device 104 that can be used according to the present invention to locate and use peripheral devices 102 that are within a given area 106. As indicated in FIG. 1, the portable computing device 104 can comprise a personal digital assistant (PDA). Although a PDA is shown for purposes of example, it is to be understood that the portable computing device 104 can comprise substantially any portable computing device capable of storing and transmitting information including, but not limited to, a notebook computer or a mobile telephone.

Figure 2:
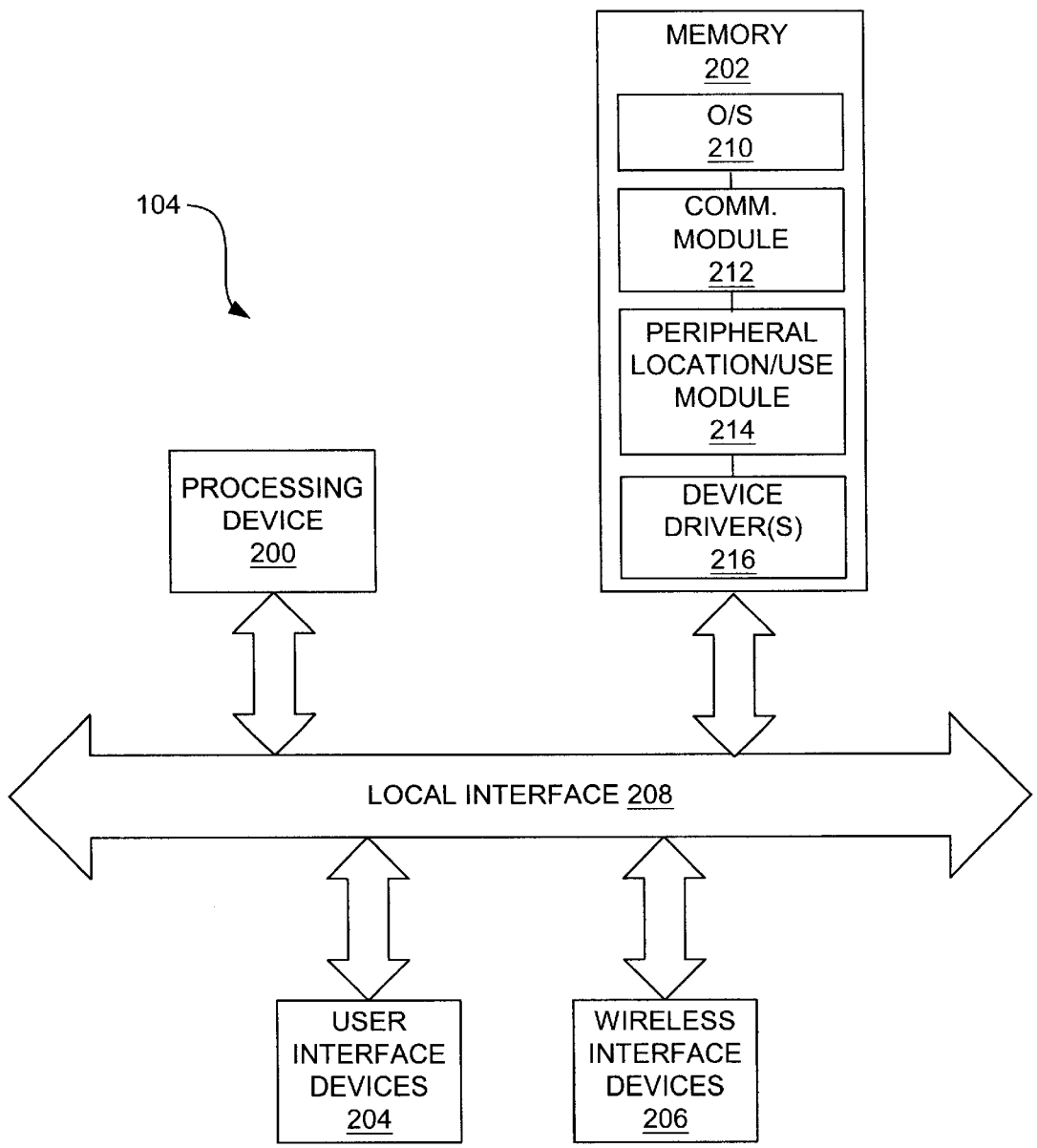
FIG. 2 is a schematic view of an example architecture of a peripheral device shown in FIG. 1.

FIG. 2 is a schematic view illustrating an example architecture for the portable computing device 104 shown in FIG. 1. As indicated in FIG. 2, the portable computing device 104 comprises a processing device 200, memory 202, user interface devices 204, wireless interface devices 206, and a local interface 208 to which each of the other components electrically connects. The processing device 200 is adapted to execute commands stored in memory 202 and may comprise a general-purpose processor, a microprocessor, one or more application-specific integrated circuits (ASICs), a plurality of suitably configured digital logic gates, and other well known electrical configurations comprised of discrete elements both individually and in various combinations to coordinate the overall operation of the portable computing device 104. The user interface devices 204 typically comprise user interface tools such as one or more function keys and touch-sensitive screen (e.g., liquid crystal display) with which the user can view information and communicate commands to the portable computing device 104. The wireless interface devices 206 can include a wireless transceiver with which data can be wirelessly transmitted and received. When provided, the wireless transceiver preferably is adapted for omnidirectional communications such as short range radio frequency (RF) communications. Example protocols include Bluetooth™ from Bluetooth SIG™ and 802.11 protocol in compliance with the institute of electrical and electronics engineers (IEEE) specifications. Where line-of-sight communication protocols are desired, the wireless interface devices 208 could, for instance, comprise an infrared (IR) transceiver.

As identified in FIG. 2, memory 202 comprises an operating system 210, a communications module 212, a peripheral location/use module 214, and a device drivers module 216. The operating system 212 contains the various commands that control general operation of the portable computing device 104. The communications module 212 comprises software and/or firmware that, along with the wireless interface devices 206, is adapted to facilitate wireless communications between the portable computing device 104 and the peripheral device 102. As described below in relation to FIGS. 3A and 3B, the peripheral location/use module 214 comprises software and/or firmware that is adapted to facilitate the location and use of the peripheral device 102. The device drivers module 216 comprises one or more drivers that configure the data to be transmitted to the peripheral device such that it can be used by the device. By way of example, the drivers can comprise a printer driver where the peripheral device is a printer.

Figure 3A:
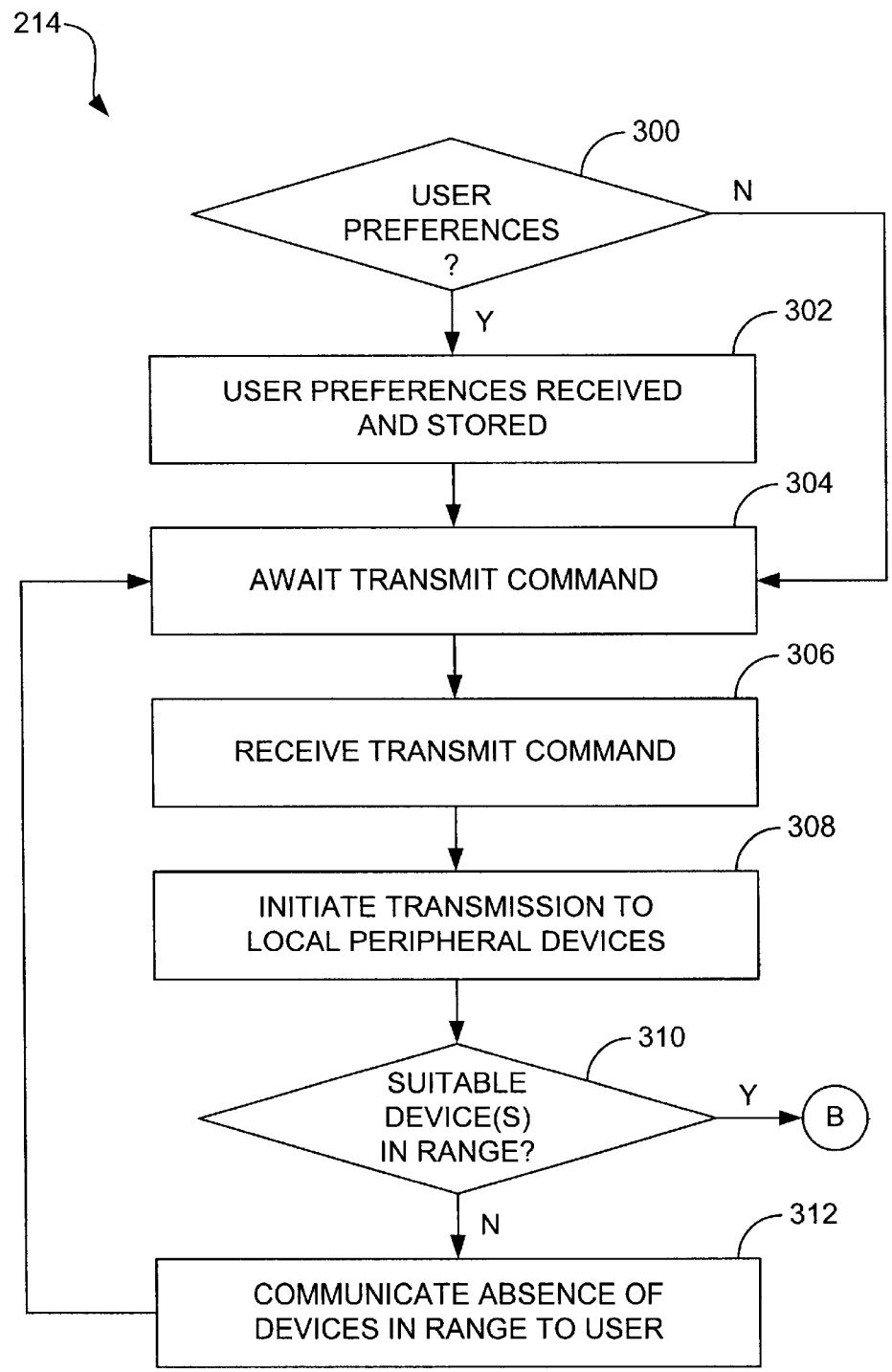
FIGS. 3A–3B provide a flow diagram that illustrates the operation of a peripheral location/use module shown in FIG. 2.
Figure 3B:
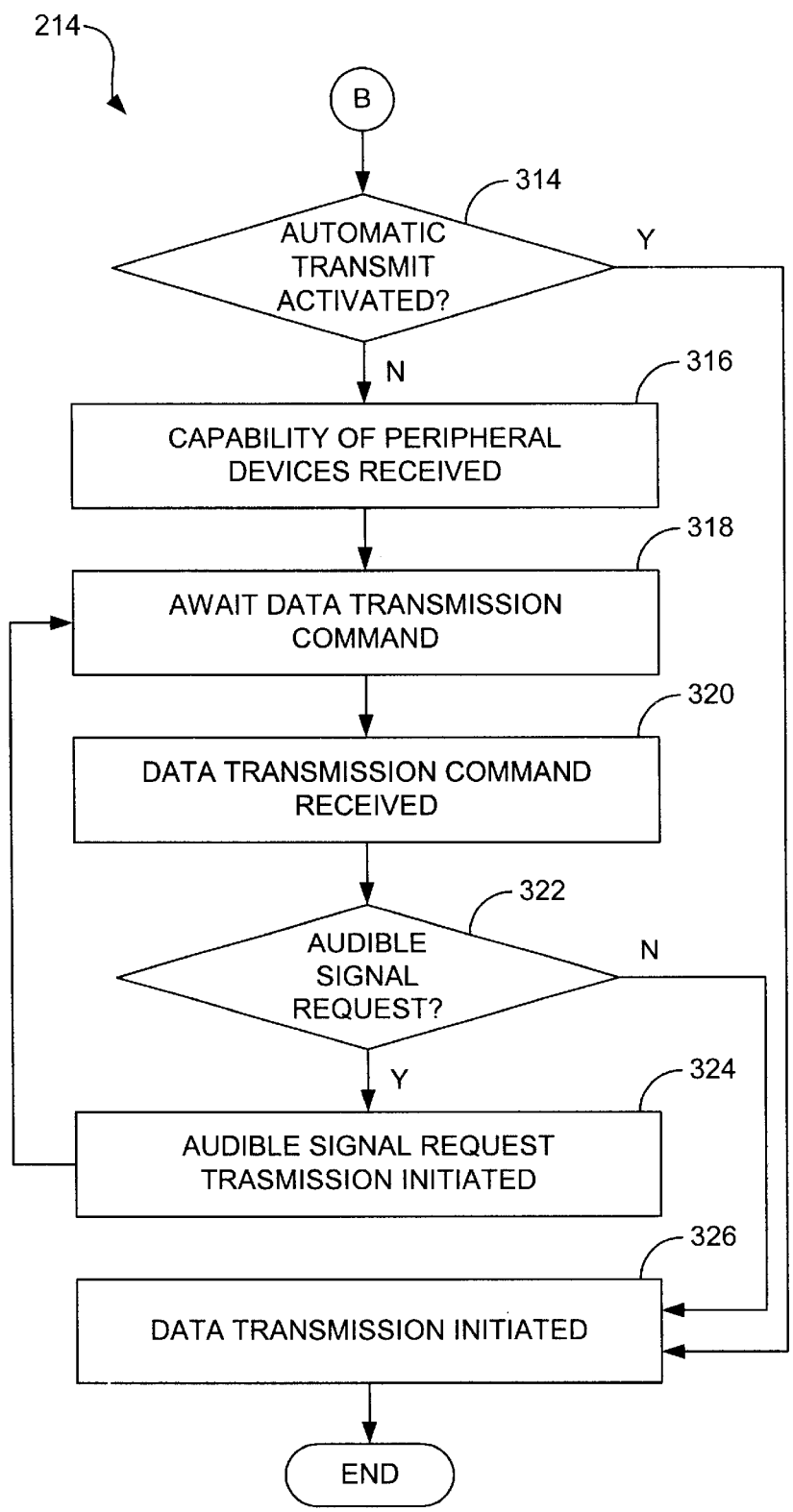

FIGS. 3A and 3B describe the functionality of the peripheral location/use module 214. As indicated in decision element 300 of FIG. 3A, it can be first determined whether the user has any particular preferences for use of the inventive system. Such preferences can include preferences as to particular machines the user prefers (e.g., peripheral devices of a particular vendor) or preferences as to the work that is to be performed by the peripheral device. In the latter situation, the preferences may depend upon the nature of the peripheral device 102 and the functionality for which it is configured. By way of example, where the peripheral device 102 comprises a printer, the preferences may pertain to the type of paper that is to be used, whether color printing is to be performed, desired print quality, etc. In addition, as discussed in greater detail below, the preferences can include a preferred audible signal that is to be sounded by the peripheral device 102 to aid the user in locating the device. If the user does have a particular preference for this signal, the preference may include identification of a sound file that is to be transmitted to the peripheral device 102. Furthermore, the preferences may include whether to automatically transmit data to a peripheral device in range, or to first prompt the user for a transmit command.

As indicated in FIG. 3A, if there are user preferences, flow continues to block 302 at which the user preferences are received by the module 214 and stored. If not, flow continues to block 304 described below. By way of example, the preferences can be input by the user into the portable computing device 104 through an application of the module 214 that is presented to the user via the device display. Such an application may provide the available preference selections to the user through a plurality of pull down menus or in other list forms. In addition to direct entry into the portable computing device 104, it will be appreciated that the preference selections can be made via a similar program running on a separate computing device (not shown), such as a desktop computer, and downloaded to the portable computing device 104 (e.g, through a synchronization process). Once the user preferences have been stored, the peripheral location/use module 214 can await an initial transmit command from the user, as indicated in block 304. This command can be input by the user with the device display or by selecting a shortcut key of the device 104 that has been configured for this functionality through known methods.

Once the command has been input, it is received by the module 214, as indicated in block 306, and the peripheral module location/user initiates an initial transmission to any peripheral devices 102 that may be in range of the portable computing device 104. With reference back to FIG. 1, where omnidirectional communications are used, all devices 102 within a given radius, r, that are enabled to communicate with the portable computing device 104 will receive the transmission. Referring to decision element 310, it is then determined whether devices are in range that the user can operate. Normally, this determination is made after receiving communications from the peripheral devices that identify the device type and their availability. From this information, the module 214 can determine whether the device 104 has a suitable driver for the device 102 and whether the peripheral device is configured to receive and manipulate data transmitted from the portable computing device. If no suitable devices are in range, the portable computing device 104 will communicate this to the user, as indicated in block 312. Flow then returns to block 304 at which the peripheral location/use module 214 awaits a further transmit command from the user.

If suitable peripheral devices 102 are in range, flow then continues from decision element 310 to decision element 314 in FIG. 3B. At decision element 314, it is determined whether the module 214 is configured to automatically transmit upon location of a suitable peripheral device. If so, flow continues directly to block 326 at which the data transmission is initiated. If automatic transmission is not activated, however, flow continues to block 316 at which the capability of each enabled peripheral device in range is received. This capability may indicate the status of the peripheral device 102 (e.g., whether it is ready for use) as well as whether the device can comply with each of the user preferences that were transmitted to the device (if any). The capabilities of the devices can be presented to the user, for instance, via the display of the portable computing device 104 such that the user can be given the opportunity to choose which of the peripheral devices 102 the user would like to utilize. Once the user makes this determination, the user can enter a data transmission command that is, as indicated in block 320, received by the peripheral location/use module 214.

The data transmission command can either be a request for the peripheral to sound an audible signal, or it can be a command to send data intended for use by the peripheral's functionality (e.g. printing). If the data transmitted is an audible signal request, flow continues from decision element 322 to block 324 at which the module 214 initiates the transmission of the request to the peripheral device 102. The module 214 then awaits further data transmission commands, as indicated in block 318. The user may then enter another data transmission command for the same device or a different device. The user may wish to send audible signal requests to one or more peripheral devices 102 to determine their location before selecting one of the peripheral devices to send data intended for the device's functionality. For example, if the peripheral device 102 is a printer, the user may send a request for an audible signal to several printers before selecting one of them to send a print job to be printed. If the data transmission command is not an audible signal request, then the module 214 initiates data transmission, as indicated in block 326, such that the data is transmitted to the peripheral device 102.

Figure 4:
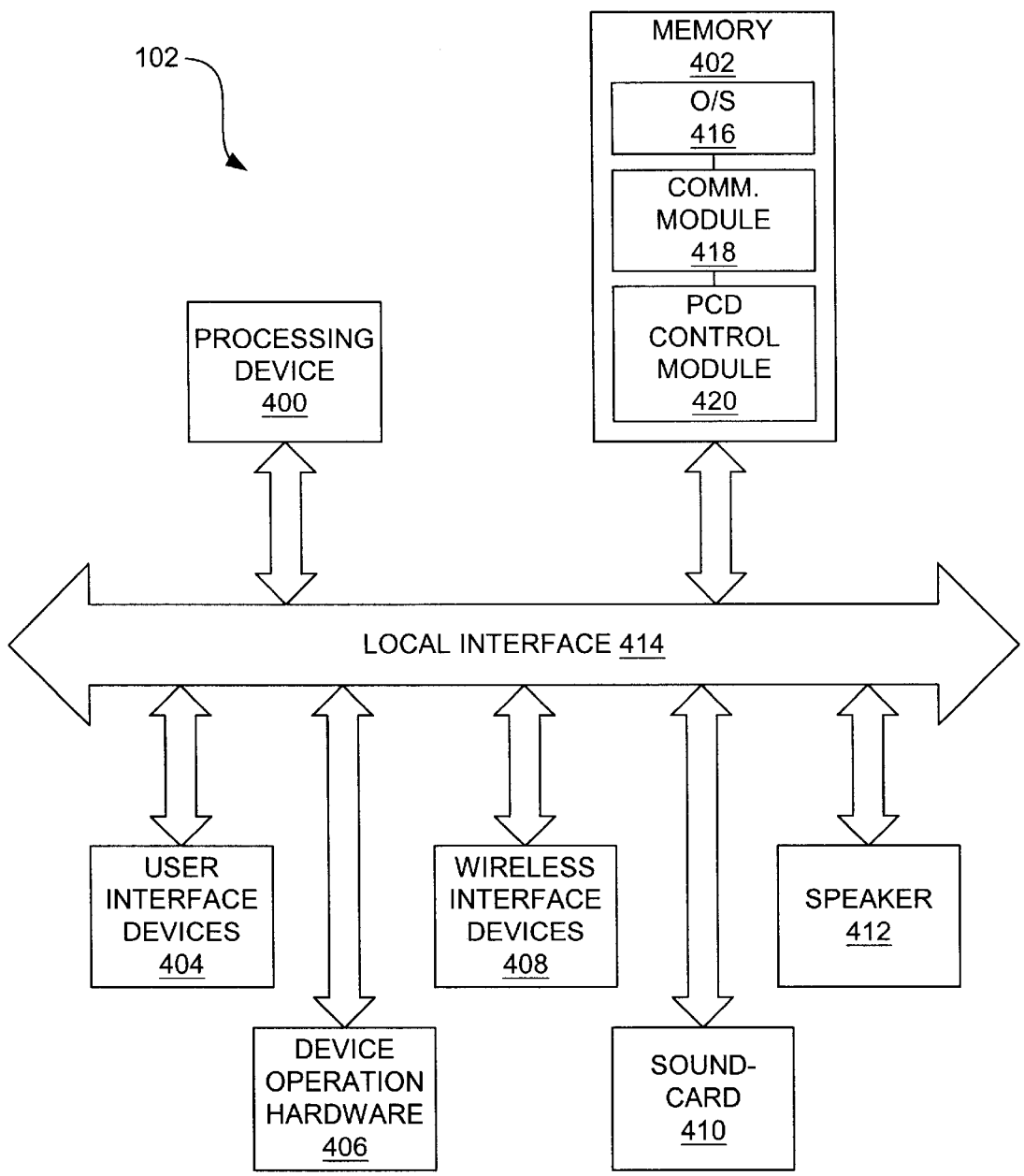
FIG. 4 is a schematic view of an example architecture of a portable computing device shown in FIG. 1.

FIG. 4 is a schematic view of an example architecture for one of the peripheral devices 102 shown in FIG. 1. As indicated in FIG. 4, the peripheral device 102 typically comprises a processing device 400, memory 402, user interface devices 404, device operation hardware 406, wireless interface devices 408, a soundcard 410, a speaker 412, and a local interface 414 to which each of the other components electrically connects. The processing device 400 is adapted to execute commands stored in memory 402 and may comprise a general-purpose processor, a microprocessor, one or more ASICs, a plurality of suitably configured digital logic gates, and other well known electrical configurations comprised of discrete elements both individually and in various combinations to coordinate the overall operation of the peripheral device 102. The user interface devices 404 typically comprise user interface tools such as various function keys that are used to operate the peripheral device 102 and a display screen in which the status and setting of the device can be communicated to the user.

The device operation hardware 406 comprises the various mechanisms used to perform the particular functionality for which the peripheral device 102 is adapted. For instance, where the peripheral device comprises a printer, these mechanisms can include a scanner, various document feeders, and so forth. The wireless interface devices 408 include a wireless transceiver through which data can be wirelessly transmitted from and received by the peripheral device 102. The wireless transceiver preferably is adapted for omnidirectional communications such as short range radio frequency (RF) communications. Example protocols include Bluetooth protocol from Bluetooth SIG™ and 802.11 protocol in compliance with the IEEE. Although omnidirectional communication protocols are preferred, it will be appreciated that a line-of-sight communication protocol could be used, if desired. In such a situation, the wireless interface devices 408 could, for instance, comprise an infrared (IR) transmitter/receiver. As is discussed in greater detail below, the soundcard 410 and speaker 412 provide audible signals to the user to aid the user in locating the peripheral device 102, and in using it.

As identified in FIG. 4, memory 402 comprises an operating system 416, a communications module 418, and a portable computing device (PCD) control module 420. The operating system 416 contains the various commands used to control general operation of the peripheral device 102. The control module 418 comprises software and/or firmware that is adapted to facilitate communications with the portable computing device 104. More particularly, the communications module 418 is adapted to facilitate wireless communications with the portable computing device 104, such as short range RF communications. As is discussed below in relation to FIG. 5, portable computing device control module 420 comprises software and/or firmware that is adapted to communicate with the portable computing device 104 to facilitate location and use of the peripheral device 102 with the portable computing device.

Figure 5:
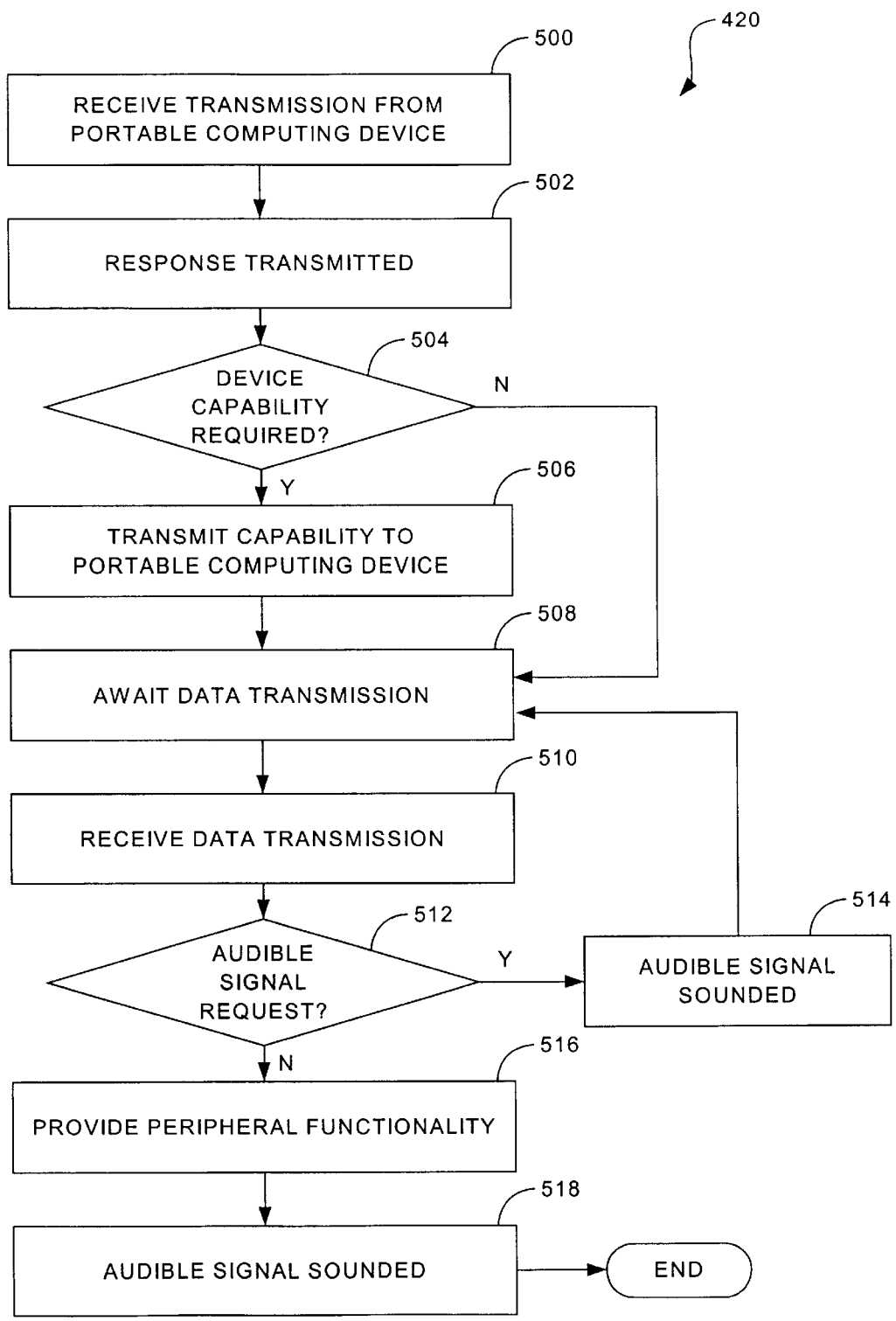
FIG. 5 is a flow diagram that illustrates the operation of a portable computing device module control shown in FIG. 4.

FIG. 5 illustrates the functionality of the portable computing device control module 420 shown in FIG. 4. As indicated in block 500 of FIG. 5, the module 420 receives an initial transmission from the portable computing device 104. As identified above, this transmission can include information as to user preferences regarding formatting, etc. Once the transmission is received, the module 420 responds to the transmission with its configuration (i.e., suitability), as indicated in block 502. Next, as indicated at decision element 504, it can be determined whether the transmission of the peripheral device's capabilities are required by the portable computing device 104. If so, this information is transmitted back to the portable computing device 104, as indicated in block 506. The peripheral device 102 can then await data transmission, as indicated in block 508. If capability information is not required, flow can continue directly from decision element 504 to block 508. Once the data transmission has been initiated, the module 420 receives the data, as indicated in block 510, and proceeds to determine, as indicated in decision element 512, whether the data transmission is an audible alert request, or whether the data is intended for the device's functionality (e.g., a print job).

If the data transmission is determined to be an audible signal request, an audible signal is sounded, as indicated in block 514, which identifies the location of the peripheral device 102 that received the data transmission. The device 102 then awaits further data transmissions, as indicated in block 508. In one arrangement, this audible signal can be one or a series of "beep" sounds that can be produced by the speaker 412. In another arrangement, this sound can comprise one of several sounds that are stored in the module 420 and specifically selected by the user through the preferences transmitted to the peripheral device 102. In such an embodiment, the signal can be more complex, for example, a few bars of a song produced with the aid of the sound card 410. In a further arrangement, the signal can be formed from a sound file transmitted from the portable computing device 104 as a user preference. As will be appreciated by persons having ordinary skill in the art, the latter two arrangements permit a distinctive signal to be sounded to help the user locate the peripheral device 102 in situations where more than one person is transmitting information to the peripheral device(s) at the same time. If the data transmission is determined to be data intended for the peripheral's functionality (e.g., a print job), the peripheral device 102 can perform that functionality, as indicated in block 516. After performing its functionality, an audible signal is sounded, as indicated in block 518, to help the user to locate the device, and to indicate that the peripheral has completed performing its functionality (e.g., the job has finished printing).

Various software and/or firmware modules have been described herein. It is to be understood that these modules can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 6:
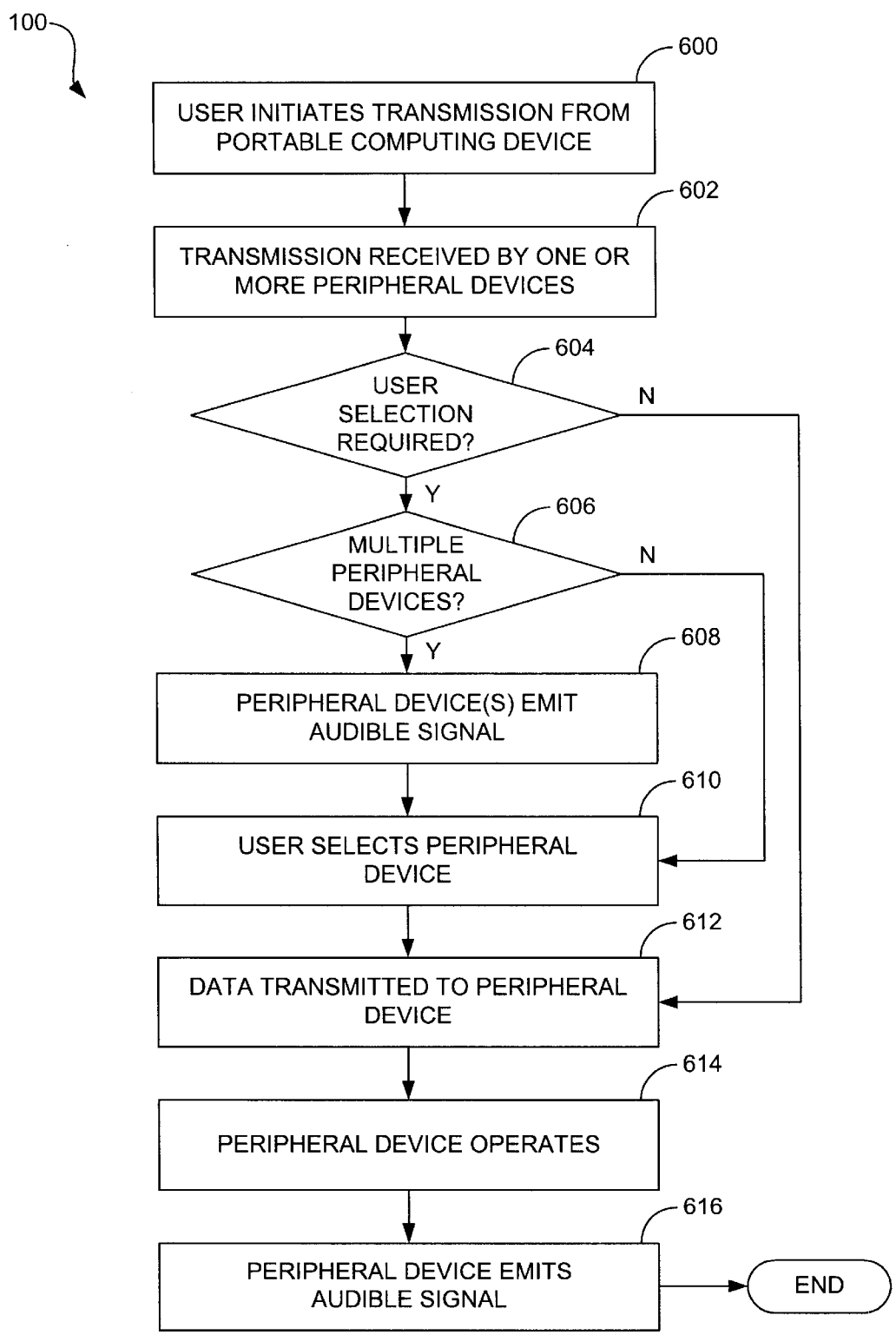
FIG. 6 is a flow diagram that describes a method for using a portable computing device to locate and use a peripheral device in the system of FIG. 1.

Operation of the inventive system and method will now be described with reference to FIG. 6. As identified in block 600, the user first initiates transmission from the portable computing device 104. As noted above, this step can comprise selecting a transmit option from the device display or selecting a shortcut key of the device 104. Again, the transmission preferably is an omnidirectional transmission using a short range RF protocol. If there are peripheral devices 102 within range that are configured to receive such a transmission, e.g., within a radius, r, shown in FIG. 1, the transmission will be received by one or more of the peripheral devices, as indicated in block 602.

Continuing from decision element 604, it is determined whether the user will first select the peripheral device 102 to use. For instance, as described above, if the peripheral location/use module 214 is configured to automatically transmit information, no such selection is needed and flow continues directly to block 612 where the data is transmitted to the peripheral device(s). If selection is required, a list of suitable peripheral devices is displayed to the user by the portable computing device 104. If, as indicated at decision element 606, there are multiple peripheral devices 102, flow continues to block 608 and the devices emit their audible signals to help the user determine their location prior to selecting a particular device or devices. As discussed above, this signal can comprise one or more beeps, or a more complex signal that is either stored within device memory 402 or transmitted to the peripheral device 102 from the portable computing device 104. Flow then continues to block 610 at which the user selects the particular device or devices the user would like to use. Again, this decision can be made by the user with reference to various device capabilities that are transmitted to the portable computing device 104 from the peripheral devices 102, as well as the device location. Once the user has selected the peripheral device or devices 102 that will be used, data is transmitted to the peripheral device(s) as indicated in block 612. Once the data has been transmitted to the peripheral device 102, the peripheral device performs the functionality for which it is configured, as indicated in block 614. For instance, where the peripheral device 102 is a printer or another device configured for printing, the device can print out data that is transmitted to the device. The peripheral device 102 then sounds an audible signal, as indicated in block 616, to identify its location to the user and to indicate that it has finished printing. The user can then pick up the print job and flow is terminated.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for locating and using a peripheral device, comprising the steps of:

wirelessly transmitting an initial communication with a portable computing device to determine if an available peripheral device is nearby;

awaiting an audible signal from a peripheral device that is nearby, the signal identifying a location of the peripheral device; and wirelessly transmitting print data to the peripheral device with the portable computing device.

2. The method of claim 1, wherein the step of transmitting an initial communication comprises transmitting user preferences as to peripheral device operation from the portable computing device.

3. The method of claim 2, wherein transmitting user preferences comprises transmitting user print preferences.

4. The method of claim 1, further comprising the step of receiving a response communication from a peripheral device within wireless communication range of the portable computing device.

5. The method of claim 4, wherein the step of transmitting print data to the peripheral device with the portable computing device occurs automatically upon receipt of the response communication from the peripheral device.

6. The method of claim 4, wherein the response communication from the peripheral device comprises information about functional capabilities of the peripheral device.

7. The method of claim 6, further comprising the step of selecting the peripheral device to use with the portable computing device.

8. The method of claim 4, wherein the information about functional capabilities comprises information about print capabilities.

9. The method of claim 1, wherein the initial communication and print data are transmitted via a short range radio frequency (RF) protocol from the portable computing device to the peripheral device.

10. The method of claim 1, wherein transmitting an initial communication comprises transmitting the initial communication with a personal digital assistant (PDA).

11. The method of claim 1, wherein transmitting an initial communication comprises transmitting the initial communication with a notebook computer.

12. The method of claim 1, wherein transmitting an initial communication comprises transmitting the initial communication with a notebook computer.

13. The method of claim 1, wherein awaiting an audible signal comprises awaiting sounding of distinctive audible signal that was selected by a user wishing to use a peripheral device.

14. The method of claim 1, wherein the audible signal comprises a song.

15. The method of claim 1, wherein the audible signal is formed using a sound file stored on the peripheral device.

16. A system for locating and using a peripheral device, comprising:

means for wirelessly transmitting an initial communication to locate peripheral devices in a given location;

means for receiving a response communication from at least one peripheral device within the location;

means for receiving a selection of a peripheral device from which a response communication was received; and means for wirelessly transmitting print data to the selected peripheral device.

17. The system of claim 16, further comprising means for requesting information about functional capabilities of at least one peripheral device from which a response communication was received.

18. The system of claim 16, wherein the means for transmitting print data comprises means for automatically transmitting the print data upon receipt of the response communication from a peripheral device.

19. A system for facilitating use of a peripheral device, comprising:
- logic configured to receive a wirelessly transmitted initial communication from a proximate portable computing device;
- logic configured to transmit a response communication to the portable computing device;
- logic configured to emit an audible signal to identify the location of the peripheral device to a user; and
- logic configured to receive wirelessly transmitted print data from the portable computing device.

20. The system of claim 19, wherein the logic configured to transmit a response communication comprises logic configured to transmit information about functional capabilities of the peripheral device.

21. The system of claim 20, wherein the logic configured to transmit information about functional capabilities comprises logic configure to transmit information about print capabilities of the peripheral device.

22. The system of claim 19, wherein the logic configured to emit an audible signal is configured to sound of distinctive audible signal that was selected by a user wishing to use the peripheral device.

23. The system of claim 19, wherein the logic configured to emit an audible signal is configured to play song.

24. The system of claim 19, wherein the logic configured to emit an audible signal is configured to form the signal using a sound file stored on the peripheral device.

* * * * *

UNITED STATES PATENT AND TRADEMARK OFFICE
CERTIFICATE OF CORRECTION

PATENT NO.      : 6,745,253 B2
DATED           : June 1, 2004
INVENTOR(S)     : Christian L. Struble It is certified that error appears in the above-identified patent and that said Letters Patent is hereby corrected as shown below:

<u>Column 8,</u>
Lines 57 and 60, delete "a" and insert therefor -- an audible --

<u>Column 10,</u>
Line 13, after "play" insert -- a --
Line 5, delete "configure" and insert therefor -- configured --

Signed and Sealed this

Twenty-second Day of February, 2005

JON W. DUDAS
*Director of the United States Patent and Trademark Office*